United States Patent [19]
Watanuki

[11] Patent Number: 5,516,275
[45] Date of Patent: May 14, 1996

[54] INJECTION NOZZLE FOR MINIMIZING STRINGING OF AN INJECTION MATERIAL

[75] Inventor: Haruo Watanuki, Nagano, Japan

[73] Assignee: Nissei Plastic Industrial Co., Ltd., Nagano, Japan

[21] Appl. No.: 301,486

[22] Filed: Sep. 7, 1994

[51] Int. Cl.⁶ .................................................. B29C 45/20
[52] U.S. Cl. .......................................... 425/549; 425/562
[58] Field of Search ................................. 425/549, 562, 425/563, 564, 565, 566

[56] References Cited

U.S. PATENT DOCUMENTS 4,345,892  8/1982  Schulte et al. ........................... 425/549
4,771,164  9/1988  Gellert .................................... 425/549
5,235,737  8/1993  Gellert .................................... 425/549

FOREIGN PATENT DOCUMENTS 6-198677  7/1994  Japan.

*Primary Examiner*—Tim Heitbrink
*Attorney, Agent, or Firm*—Weingarten, Schurgin, Gagnebin & Hayes

[57] ABSTRACT

An injection nozzle having a thread provided on an inner peripheral wall of a nozzle bore at a nozzle head thereof. With the thread, the inner peripheral wall is formed into an uneven surface along a length 1.5 to 4 times the nozzle bore diameter. The fluid resistance against the inner peripheral wall of the nozzle bore is allowed to increase, thereby preventing resin stringing.

3 Claims, 1 Drawing Sheet

INJECTION NOZZLE FOR MINIMIZING STRINGING OF AN INJECTION MATERIAL

BACKGROUND OF THE INVENTION

1. Field of the Invention

This invention relates to an injection nozzle on the head portion of an injection machine used for molding by use of a resin.

2. Background Art

An injection molding is performed either by a method by which the injection molding is continued with a nozzle head of a injection nozzle left abutted against a mold, or by a method by which abutting/deabutting of the nozzle head is repeated for each shot. The molding performed by repeating the abutting/deabutting causes a resin stringing to occur by a material resin.

The stringing refers to a phenomenon that when the injection molding is finished and a resin in a sprue bush cools to solidify, the remaining resin in a nozzle bore of the injection nozzle is still in a melted state and thus communicates with the resin remaining in the sprue bush, with the result that as the nozzle leaves the sprue bush, the remaining resin in the nozzle bore is drawn due to the viscous ductility of the resin itself and elongates like string.

The stringing is apt to occur in resins such as polyamide, ABS and polycarbonate, and although a material loss due to the stringing for each shot is not so large, the stringing resin sticks to the periphery of the sprue bush in the mold to cause fouling or a nozzle touch trouble, and a cold stringing resin becomes a cold slug to full up a pin gate or to cause a poor molding (jetting), so that it is desirable to develop stringing preventive means.

SUMMARY OF THE INVENTION

The present invention has been made in view of the above-mentioned circumstances and it is an object of the present invention to provide an injection nozzle for preventing stringing, which can be readily applied to conventional injection nozzles, with very simple means and without any necessity of a special technology for molding.

The feature of the present invention according to the above-mentioned object exists in that a thread is provided on an inner peripheral wall of a nozzle bore at a nozzle head of an injection nozzle, whereby an uneven surface with a length 1.5 to 4 times the nozzle bore diameter is formed on the inner peripheral wall.

With the above-mentioned arrangement, the uneven surface due to the thread increases the fluid resistance against the inner peripheral wall, and a melted resin bites at its periphery into the inner peripheral wall to remain in a hard-to-fluidize state in the nozzle bore, so that even when the nozzle head is separated from the nozzle bush, the resin stringing hardly occurs. Further, the inner peripheral area of the nozzle bore which is provided with the thread becomes wide to cause a larger cooling area, so that the solidified resin portion at the nozzle head contracts due to cooling and thus is separated from the uneven surface, whereby the portion is taken out together with the sprue.

DETAILED DESCRIPTION OF THE PREFERRED EMBODIMENTS

Figure 1:
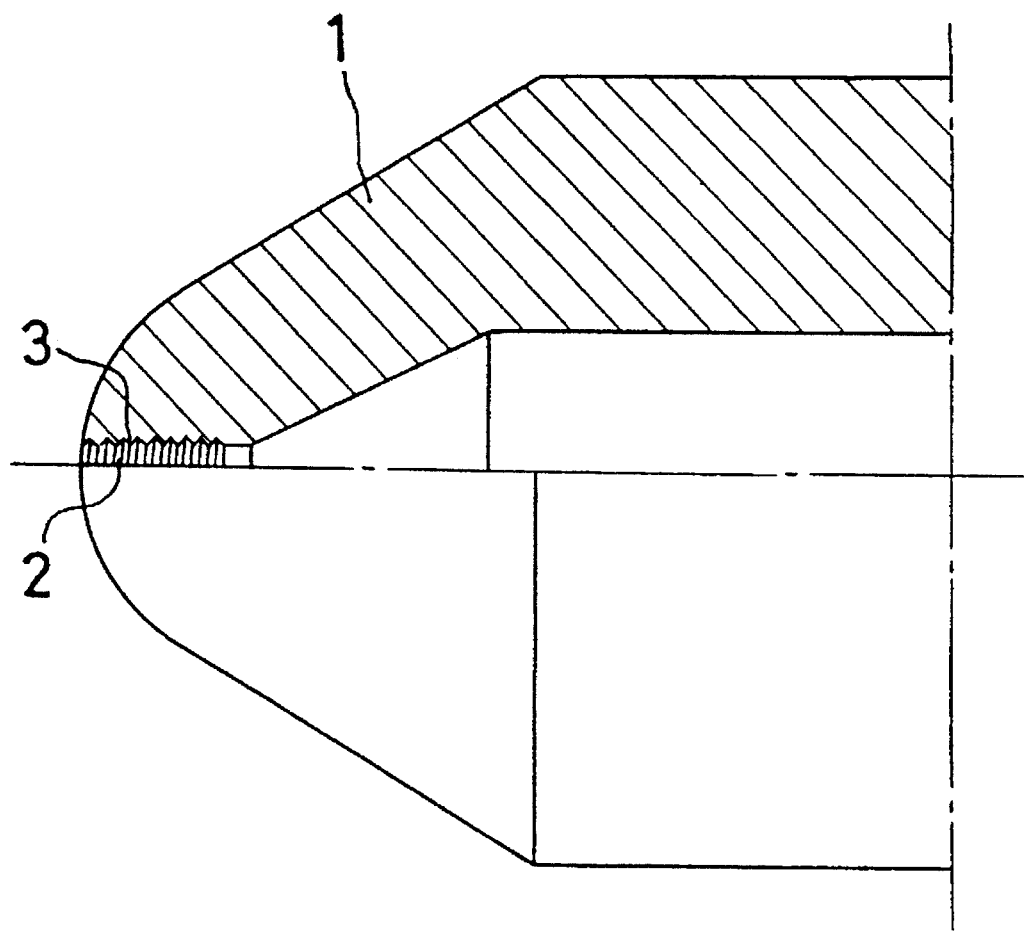
FIG. 1 is a half cutaway sectional view of the principal part of an injection nozzle in connection with the present invention.

In FIG. 1, the numeral 1 indicates a nozzle in which a nozzle bore 2 is bored in the center of the nozzle head. A female thread is provided on an inner peripheral wall 3 of the nozzle bore 2, thereby causing the inner peripheral wall 3 to exhibit an uneven surface due to the thread ridge and bottom.

The above-mentioned female thread is a JIS metric coarse thread with dimensions of M3 (3 mm in diameter) and 0.5 mm in pitch, and preferably the dimensions, which vary with a material resin used, are such that the length is within 1.5 to 4 times the nozzle diameter (M3) and the thread dimension within 2 to 7 mm.

In such an injection nozzle, the uneven surface increases the frictional resistance of the inner peripheral wall 3, and a melted resin bites at its periphery into the inner peripheral wall 3 to remain in a hard-to-fluidize state in the nozzle bore 2, so that even when the resin is subject to an external tensile force due to the viscosity of the material resin itself, the resin becomes hard to fluidize compared with a case where no uneven surface is provided, whereby the resin stringing apt to occur when the nozzle head is separated from a mold becomes unlikely to occur.

The following shows results of stringing for a standard injection nozzle (B) with a flat inner peripheral wall of nozzle bore and a diameter 3 mm, and for another injection nozzle (A) of the present invention which is obtained by providing a female thread with 0.5 mm in pitch and 10 mm long on the inner peripheral wall of the standard injection nozzle. The mold temperature employed was set to 40° C., and the injection machine used was PS20E2ASE manufactured by Nissei Plastic Industrial Co., Ltd.

| Injection nozzle | Nozzle temp (°C.) | Stringing length (mm) |
| --- | --- | --- |
| [Material resin] Polyamide66 (Toray Amiran CM3001-N) | | |
| (A) | 260 | 0 |
| (A) | 270 | 0 |
| (B) | 260 | 12.8 |
| (B) | 270 | 39.9 |
| [Material resin] ABS (JSRABS 10) | | |
| (A) | 210 | 8.0 |
| (A) | 220 | 35.0 |
| (B) | 210 | 74.2 |
| (B) | 220 | 101.2 |
| [Material resin] Polycarbonate (Idemitsu Petrochemical Taflon R2200) | | |
| (A) | 270 | 3.2 |
| (A) | 280 | 2.8 |
| (B) | 270 | 22.4 |
| (B) | 280 | 107.0 |

Better results were obtained where a taper of about 2° was formed on the side wall of the nozzle bore of the injection nozzle according to the present invention.

As described above, the present invention is superior in stringing preventive effect to conventional standard injection nozzles, and needs only to provide a female thread in the nozzle bore to form an uneven surface on the inner peripheral surface, so that the invention has features such that it is readily applied to conventional injection nozzles and less expensive.

While the present invention has been described above with respect to preferred embodiments thereof, it should of course be understood that the present invention should not be limited only to these embodiments but various changes or modifications may be made without departure from the scope of the present invention as defined by the appended claims.

What is claimed is:

1. An injection nozzle characterized in that a thread is provided on an inner peripheral wall of a nozzle bore contacted by injectant at a nozzle head of the injection nozzle to form an uneven surface with a length 1.5 to 4 times the nozzle bore diameter on the inner peripheral wall whereby stringing of the injectant is hindered.

2. An injection nozzle comprising a nozzle head having a nozzle bore through which a material to be injected is flowable, the nozzle bore forming a passage having an internal peripheral wall disposed to contact the material to be injected, the internal peripheral wall having a thread provided thereon to form an uneven surface, whereby stringing of the material to be injected is minimized.

3. The injection nozzle of claim 2, wherein the thread has a length of 1.5 to 4 times the nozzle bore diameter.

* * * * *